(12) United States Patent
Rawlinson et al.

(10) Patent No.: US 8,960,781 B2
(45) Date of Patent: Feb. 24, 2015

(54) SINGLE PIECE VEHICLE ROCKER PANEL

(75) Inventors: Peter Dore Rawlinson, Playa Del Rey, CA (US); Michael John Baldwin, Sunnyvale, CA (US); Hitendra Laxmidas Gadhiya, Irvine, CA (US); Alexi Charbonneau, Hermosa Beach, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 292 days.

(21) Appl. No.: 13/308,206

(22) Filed: Nov. 30, 2011

(65) Prior Publication Data

US 2012/0153682 A1 Jun. 21, 2012

Related U.S. Application Data

(60) Provisional application No. 61/424,900, filed on Dec. 20, 2010.

(51) Int. Cl.
*B60R 16/04* (2006.01)
*B60J 10/08* (2006.01)
*B60J 10/00* (2006.01)
*B62D 25/02* (2006.01)

(52) U.S. Cl.
CPC ............ *B60J 10/083* (2013.01); *B60J 10/0031* (2013.01); *B62D 25/02* (2013.01); *Y10S 903/907* (2013.01)
USPC .......................... 296/209; 180/68.5; 903/907

(58) Field of Classification Search
USPC .................. 296/187.12, 193.05, 203.03, 209; 903/903, 907, 952; 180/68.5
See application file for complete search history.

(56) References Cited

U.S. PATENT DOCUMENTS

| | | | | |
|---|---|---|---|---|
| RE19,975 E | * | 5/1936 | Swallow ........................ | 296/209 |
| 2,597,837 A | * | 5/1952 | Lindsay ..................... | 296/181.4 |
| 4,471,992 A | | 9/1984 | Matsuura et al. | |
| 4,493,506 A | * | 1/1985 | Alexander ..................... | 296/209 |
| 4,826,238 A | * | 5/1989 | Misono et al. ................ | 296/209 |
| 4,911,495 A | | 3/1990 | Haga et al. | |
| 5,201,566 A | * | 4/1993 | Mori ............................. | 296/192 |
| 5,332,281 A | * | 7/1994 | Janotik et al. ................ | 296/209 |
| 5,338,080 A | * | 8/1994 | Janotik et al. .................. | 296/29 |
| 5,370,438 A | * | 12/1994 | Mori et al. ................ | 296/203.02 |
| 5,585,205 A | * | 12/1996 | Kohchi .......................... | 429/99 |
| 5,619,784 A | * | 4/1997 | Nishimoto et al. ............. | 29/430 |
| 5,620,057 A | * | 4/1997 | Klemen et al. ............... | 180/68.5 |
| 5,765,906 A | * | 6/1998 | Iwatsuki et al. .......... | 296/203.03 |
| 6,129,410 A | | 10/2000 | Kosaraju et al. | |
| 6,139,094 A | * | 10/2000 | Teply et al. .............. | 296/203.03 |
| 6,227,322 B1 | * | 5/2001 | Nishikawa ................... | 180/68.5 |
| 6,234,568 B1 | * | 5/2001 | Aoki ......................... | 296/203.04 |
| 6,283,539 B1 | * | 9/2001 | Enning et al. ............ | 296/203.03 |
| 6,334,642 B1 | * | 1/2002 | Waldeck et al. ................ | 296/29 |
| 6,354,656 B1 | * | 3/2002 | Hwang ......................... | 296/209 |

(Continued)

FOREIGN PATENT DOCUMENTS

EP         559176 A1  *  9/1993
JP        04092781 A   *  3/1992

(Continued)

*Primary Examiner* — Glenn Dayoan
*Assistant Examiner* — Paul Chenevert
(74) *Attorney, Agent, or Firm* — J. Richard Soderberg

(57) ABSTRACT

A vehicle rocker panel is provided that is extruded as a single piece. As extruded, the rocker panel may include one or more interior reinforcing walls as well as interior and exterior design features.

17 Claims, 4 Drawing Sheets

(56) References Cited

U.S. PATENT DOCUMENTS

| | | | |
|---|---|---|---|
| 6,431,641 B2 * | 8/2002 | Miyasaka | 296/203.03 |
| 6,447,052 B2 * | 9/2002 | Saeki | 296/187.09 |
| 6,519,854 B2 | 2/2003 | Blank | |
| 6,857,692 B2 | 2/2005 | Cardimen et al. | |
| 7,083,844 B2 | 8/2006 | Yamamoto | |
| 7,464,986 B2 | 12/2008 | Maki et al. | |
| 7,857,377 B2 | 12/2010 | Chen et al. | |
| 7,926,602 B2 * | 4/2011 | Takasaki | 180/68.5 |
| 8,007,032 B1 | 8/2011 | Craig | |
| 8,297,690 B2 * | 10/2012 | Walter et al. | 296/204 |
| 8,397,853 B2 * | 3/2013 | Stefani et al. | 180/68.5 |
| 8,424,960 B2 * | 4/2013 | Rawlinson et al. | 296/203.02 |
| 8,485,594 B2 * | 7/2013 | Stanik et al. | 296/209 |
| 8,511,413 B2 * | 8/2013 | Ojima et al. | 180/68.5 |
| 8,561,743 B2 * | 10/2013 | Iwasa et al. | 180/68.5 |
| 8,608,230 B2 * | 12/2013 | Young et al. | 296/187.02 |
| 2009/0261622 A1 | 10/2009 | Rill et al. | |
| 2010/0301630 A1 | 12/2010 | Ohta et al. | |
| 2010/0308623 A1 | 12/2010 | Bodin et al. | |
| 2010/0314905 A1 | 12/2010 | Mori | |
| 2012/0070716 A1 * | 3/2012 | Yoshioka et al. | 429/156 |
| 2012/0111654 A1 * | 5/2012 | Origuchi | 180/68.5 |
| 2012/0153682 A1 | 6/2012 | Rawlinson et al. | |
| 2012/0160583 A1 * | 6/2012 | Rawlinson | 180/68.5 |
| 2012/0161472 A1 | 6/2012 | Rawlinson et al. | |
| 2012/0217076 A1 * | 8/2012 | Favaretto | 180/65.21 |
| 2012/0312615 A1 * | 12/2012 | Rawlinson | 180/68.5 |
| 2013/0248268 A1 * | 9/2013 | MATSUDA et al. | 180/68.5 |
| 2014/0079968 A1 * | 3/2014 | Schmidt et al. | 429/83 |
| 2014/0158444 A1 * | 6/2014 | Han et al. | 180/68.5 |
| 2014/0166381 A1 * | 6/2014 | Ling et al. | 180/68.5 |
| 2014/0182958 A1 * | 7/2014 | Rawlinson et al. | 180/68.5 |
| 2014/0262573 A1 * | 9/2014 | Ito et al. | 180/68.5 |
| 2014/0284125 A1 * | 9/2014 | Katayama et al. | 180/68.5 |
| 2014/0291046 A1 * | 10/2014 | Araki | 180/68.5 |

FOREIGN PATENT DOCUMENTS

| | | | |
|---|---|---|---|
| JP | 04092782 A | * | 3/1992 |
| JP | 05301583 A | * | 11/1993 |
| JP | 06166330 A | * | 6/1994 |
| JP | 2002362163 A | * | 12/2002 |

* cited by examiner

SINGLE PIECE VEHICLE ROCKER PANEL

CROSS-REFERENCE TO RELATED APPLICATION

The present application claims benefit of the filing date of U.S. Provisional Patent Application Ser. No. 61/424,900, filed 20 Dec. 2010.

FIELD OF THE INVENTION

The present invention relates generally to vehicle structures and, more particularly, to a single piece rocker panel.

BACKGROUND OF THE INVENTION

A conventional vehicle includes an assembly of panel structures, referred to collectively as a rocker or rocker panel, which fits below the base of the door openings and between the wheel wells. This same assembly may also be called a sill or a side sill.

There are a variety of techniques that may be used to fabricate and assemble the rocker panel of a car. For example, U.S. Pat. No. 4,471,992, issued 18 Sep. 1984, discloses a rocker that includes three separate panels; an outer panel, an inner panel, and a reinforcement panel interposed between the inner and outer panels. The upper and lower longitudinal edges of the three panels are welded together to form a single assembly.

U.S. Pat. No. 4,911,495, issued 27 Mar. 1990, discloses a lightweight, rigid rocker panel. The disclosed rocker includes inner and outer panels that are spot welded together along an upper joint and an outer side joint. The inner panel is thicker than the outer panel. The patent also describes a rocker panel cover, formed by injection molding in an exemplary embodiment, which may be attached to the outer rocker panel using clips or other means. The panel cover is designed to prevent rust formation on the rocker panels, including the outer side joint, by covering the outer and lower sides of the outer panel.

U.S. Patent Application Publication 2009/0261622, published 22 Oct. 2009, discloses another rocker panel design that is comprised of inner and outer sheet metal shells that are welded to one another. A stiffening member, for example using a rolled profile, is inserted into the rocker panel from an open end and then fastened in place.

Although a variety of techniques are known for fabricating and assembling the rocker panels of a vehicle, these fabrication processes are often relatively complex while yielding structures of limited rigidity. Accordingly, what is needed is a lightweight, high strength rocker panel that is easy to manufacture and provides improved torsional rigidity. The present invention provides such a rocker.

SUMMARY OF THE INVENTION

The present invention provides a single piece vehicle rocker panel, also referred to herein as simply a rocker or sill, which is fabricated as a single piece using an extrusion process. This single piece construction provides numerous advantages over the prior art approach of welding together multiple panels to create the desired rocker.

In accordance with the invention, a single piece, extruded, vehicle rocker panel is disclosed that includes at least an exterior wall, an interior wall, and at least one enclosed cavity running longitudinally throughout the panel. The rocker panel may further comprise an upper wall and a lower wall. The rocker panel may further comprise at least one reinforcing wall, where the reinforcing wall divides the enclosed cavity into at least first and second cavities. The rocker panel may further comprise at least one reinforcing wall, where the reinforcing wall is coupled to the inner surfaces of the upper and lower walls and divides the enclosed cavity into at least two side-by-side cavities. The rocker panel may further comprise at least one reinforcing wall, where the reinforcing wall is coupled to the inner surfaces of the interior and exterior walls and divides the enclosed cavity into a first cavity located within an upper portion of the vehicle rocker panel and a second cavity located within a lower portion of the vehicle rocker panel. The rocker panel may further comprise at least one horizontal reinforcing wall, for example coupled to the inner surfaces of the interior and exterior walls, and at least one vertical reinforcing wall, for example coupled to the inner surfaces of the upper and lower walls, where the horizontal and vertical reinforcing walls divide the enclosed cavity into multiple cavities.

In accordance with the invention, the single piece, extruded, vehicle rocker panel may be fabricated from aluminum, an aluminum alloy, or steel.

In accordance with the invention, the single piece, extruded, vehicle rocker panel may include a mounting flange that extends inwardly from the interior wall of the rocker panel towards the vehicle centerline. The mounting flange may be configured to provide a mounting surface for the vehicle's floor panel, wherein the floor panel may be bolted or welded to the mounting flange.

In accordance with the invention, the single piece, extruded, vehicle rocker panel may include an interior, non-reinforcing wall that extends from an inner surface of at least one rocker panel wall into the enclosed rocker panel cavity. The interior, non-reinforcing wall may be configured to locate and position a channel nut retainer within the enclosed rocker panel cavity.

In accordance with the invention, the single piece, extruded, vehicle rocker panel may be configured to provide a mounting surface for a battery pack enclosure, where the rocker panel is configured to allow the battery pack enclosure to be bolted to the rocker panel.

In accordance with the invention, the single piece, extruded, vehicle rocker panel may include upper and lower rocker sections that are staggered, for example such that the interior wall of the upper rocker section is offset from the interior wall of the lower rocker section.

A further understanding of the nature and advantages of the present invention may be realized by reference to the remaining portions of the specification and the drawings.

DESCRIPTION OF THE SPECIFIC EMBODIMENTS

Figure 1:
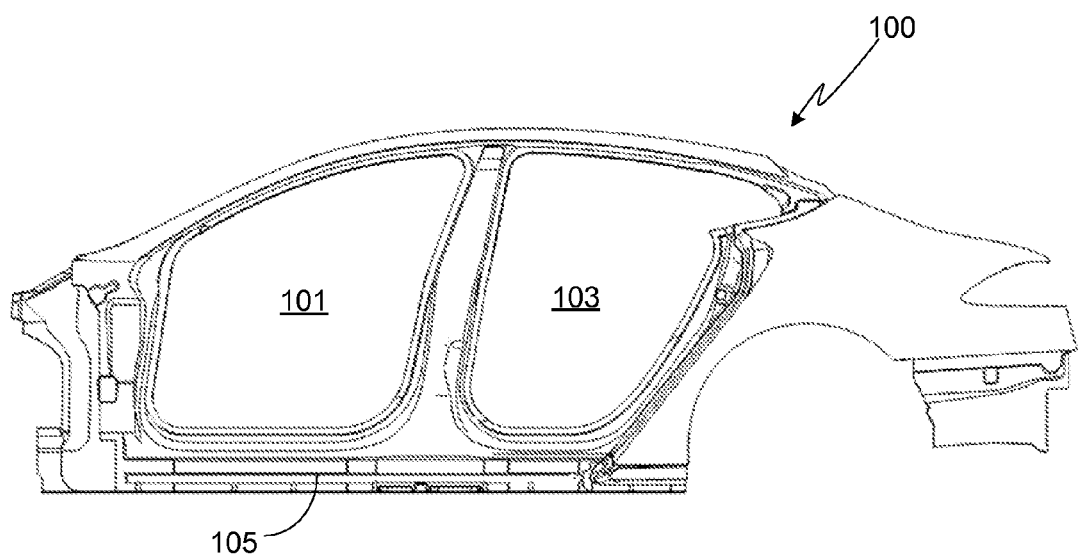
FIG. 1 provides an outside view of the rocker panel of the invention along with a portion of an exemplary vehicle to which the rocker panel is attached.
Figure 2:
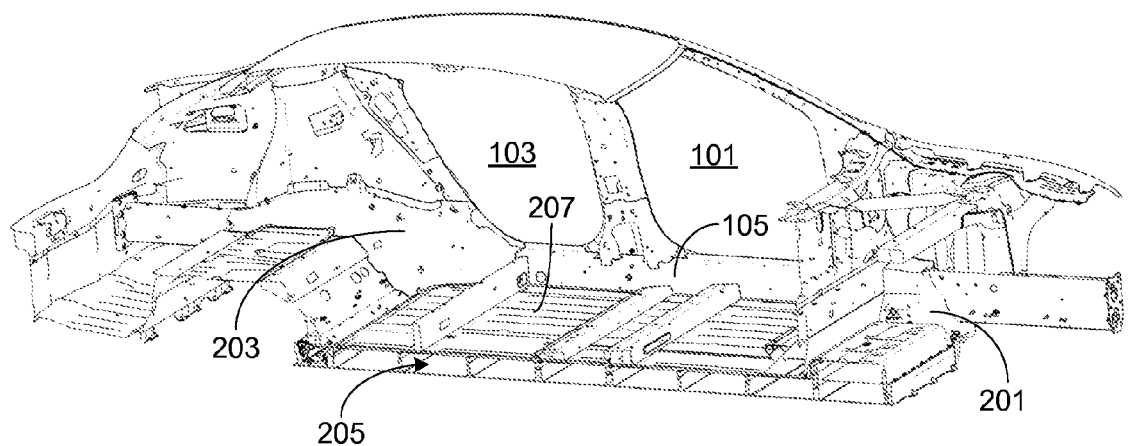
FIG. 2 provides a perspective, cross-sectional inside view of the vehicle body structure shown in FIG. 1.

FIG. 1 is a side view of the outside of a portion of the body structure of a vehicle 100. FIG. 2 provides a perspective, cross-sectional view of this same body structure, taken from the inside of vehicle 100. Extending longitudinally along the body structure, and located below door openings 101 and 103, is rocker 105, also referred to herein as a rocker panel and/or a sill. Rocker 105 extends generally between the front and rear wheel wells and, in the preferred and illustrated embodiment, extends between and is mechanically coupled to front torque box 201 and rear torque box 203.

In accordance with the invention, rocker 105 is fabricated using an extrusion process, thus allowing the rocker to be fabricated as a single piece. Preferably rocker 105 is formed using an aluminum or aluminum alloy extrusion, although it will be appreciated that the invention is not limited to these materials. For example, the rocker may be fabricated from a steel extrusion. Fabricating rocker 105 as a single piece extrusion eliminates the need to join together multiple panels, for example by welding together inner and outer panels plus potentially one or more reinforcing panels. As a result of simplifying the fabrication process and eliminating panel joints, manufacturing time and expense is reduced while achieving a lower mass rocker of consistent quality.

Figures 3, 4:
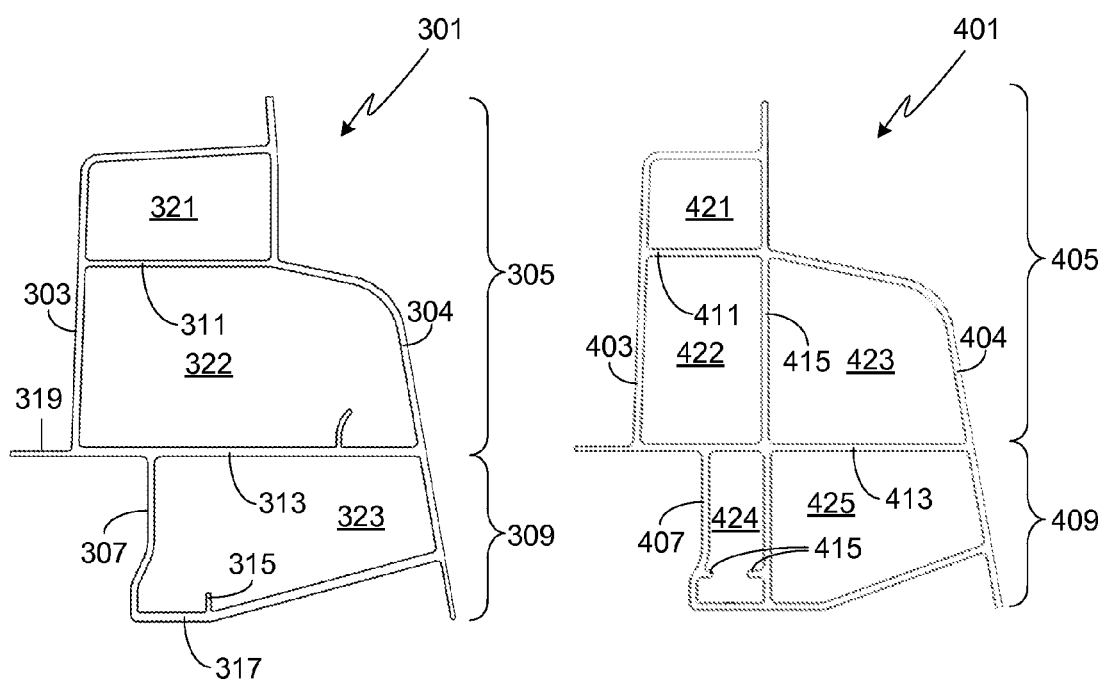
FIG. 3 provides a cross-sectional view of a preferred rocker design.
FIG. 4 provides a cross-sectional view of an alternate rocker design.

FIG. 3 provides a cross-sectional view of a preferred rocker 301. FIG. 4 provides a cross-sectional view of a rocker 401 utilizing an alternate design. As shown in the cross-sectional views of FIGS. 3 and 4, the extruded rocker of the invention has an enclosed structure that includes at least one internal cavity, also referred to herein as a lumen, between the interior and exterior walls (e.g., walls 303/304 of rocker 301 and walls 403/404 of rocker 401). Rocker 301 includes three cavities 321-323. Rocker 401 includes five cavities 421-425. Although the invention may be used with other rocker configurations, sizes and designs, in the preferred embodiment the rocker is between 150 and 200 millimeters wide and between 200 and 275 millimeters tall. Preferably the wall thickness for each of the various walls comprising the rocker is between 2 and 5 millimeters thick, and more preferably between 2 and 4 millimeters thick. It should be understood, however, that other wall thicknesses may be used depending upon the desired characteristics of the rocker (e.g., strength, rigidity, weight, location and number of reinforcing walls, extrusion material, etc.). Furthermore, due to the use of an extrusion process to fabricate the rockers of the invention, different walls of a single rocker may have different wall thicknesses, the selected thickness being based on the mechanical requirements placed on that particular wall. For example, in rocker 301 internal wall 313 and lower external wall 317 are thicker than the other rocker walls.

As the rocker of the present invention is formed via extrusion rather than by joining (e.g., welding) together multiple panels, it is easier to fabricate shapes that provide superior performance (e.g., strength and rigidity) for a given mass. For example, in the preferred embodiment shown in FIG. 3, interior wall 303 of upper section 305 is offset from interior wall 307 of lower section 309. Similarly in the embodiment shown in FIG. 4, interior wall 403 of upper section 405 is offset from interior wall 407 of lower section 409. Staggering the sections of the rocker panel provides a simple means of improving rocker rigidity.

In addition to staggering rocker sections, the extrusion process allows interior walls to be easily added during rocker fabrication as necessary to achieve the desired levels of strength and rigidity. For example, in rocker 301 a pair of horizontal walls 311 and 313 are included. Rocker 401 includes similarly positioned horizontal walls 411 and 413 plus a vertically positioned wall 415. The present invention is not limited to a specific number of interior reinforcing walls, either minimum or maximum, nor does the invention limit the location of those interior walls that are included in the extruded rocker panel.

Another advantage of extruded rocker panels is the ease by which both interior and exterior features may be added to the rocker design and integrated within the extrusion process, such features providing further functionality to the rocker panel without significantly increasing rocker fabrication complexity or cost. Interior features may be of a reinforcing nature, for example walls that extend from rocker side to rocker side, or of a non-reinforcing nature, for example walls that extend only partially into the enclosed rocker cavity. Rockers 301 and 401 each include such features. For example, in rocker 301 a small interior wall section 315 has been added to lower wall 317. As shown, wall 315 only extends a fraction of the distance from wall 317 to horizontal interior wall 313 and as such is on the order of 10 to 20 millimeters tall. In rocker 401, a pair of interior features 416 is shown.

In at least one preferred configuration, rocker 105 is used to simplify integration of a battery pack 205 under the floor panel 207 of an electric vehicle 100, this integrated approach providing enhanced vehicle performance. Note that in FIG. 2 cells are not shown contained within the battery pack, thus simplifying the figure. In this embodiment, battery pack 205 transverses the width of the vehicle, i.e., from rocker panel to rocker panel, and extends between the front and rear vehicle suspension assemblies.

Figure 5:
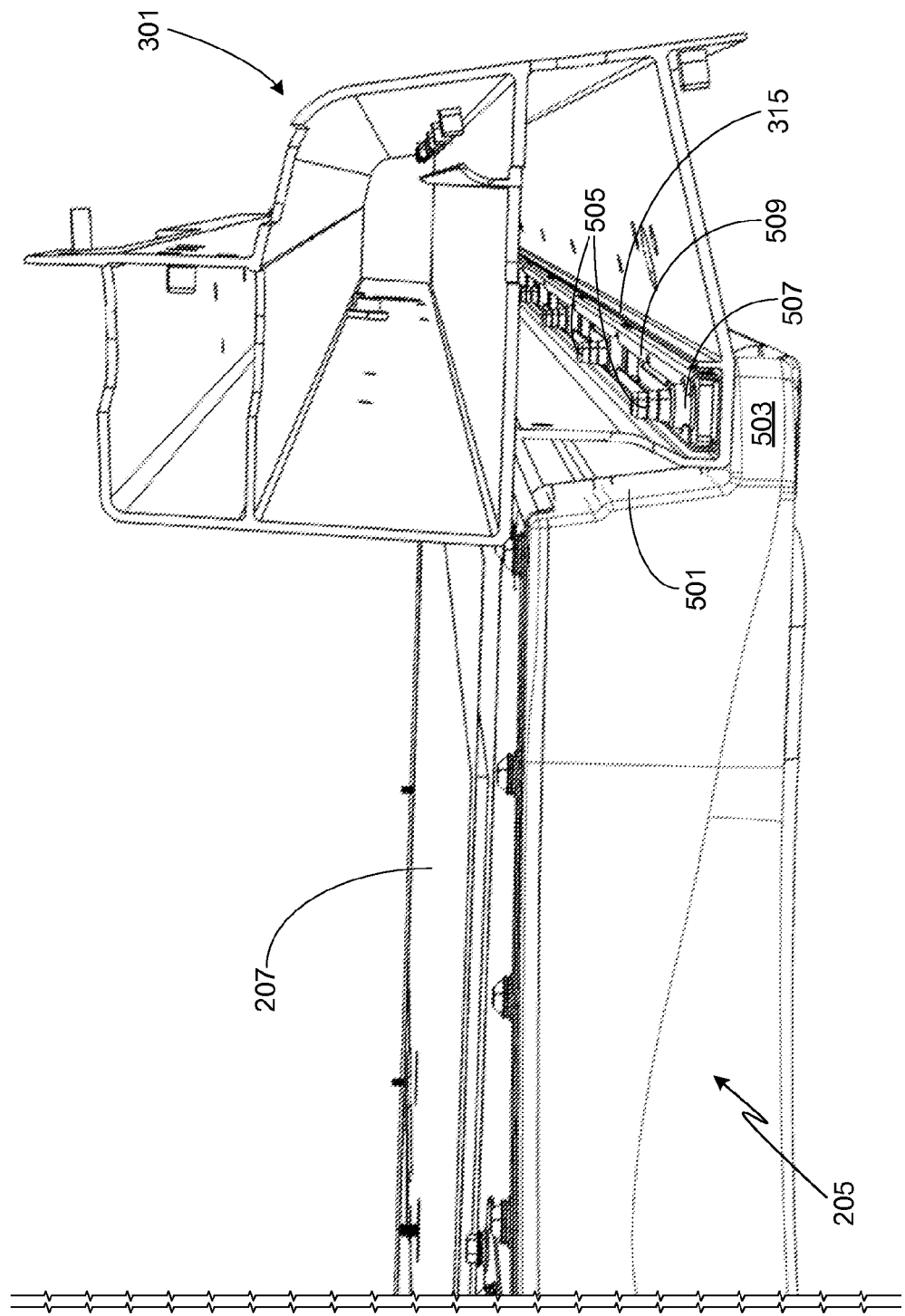
FIG. 5 provides a perspective view of a battery pack to rocker panel assembly.
Figure 6:
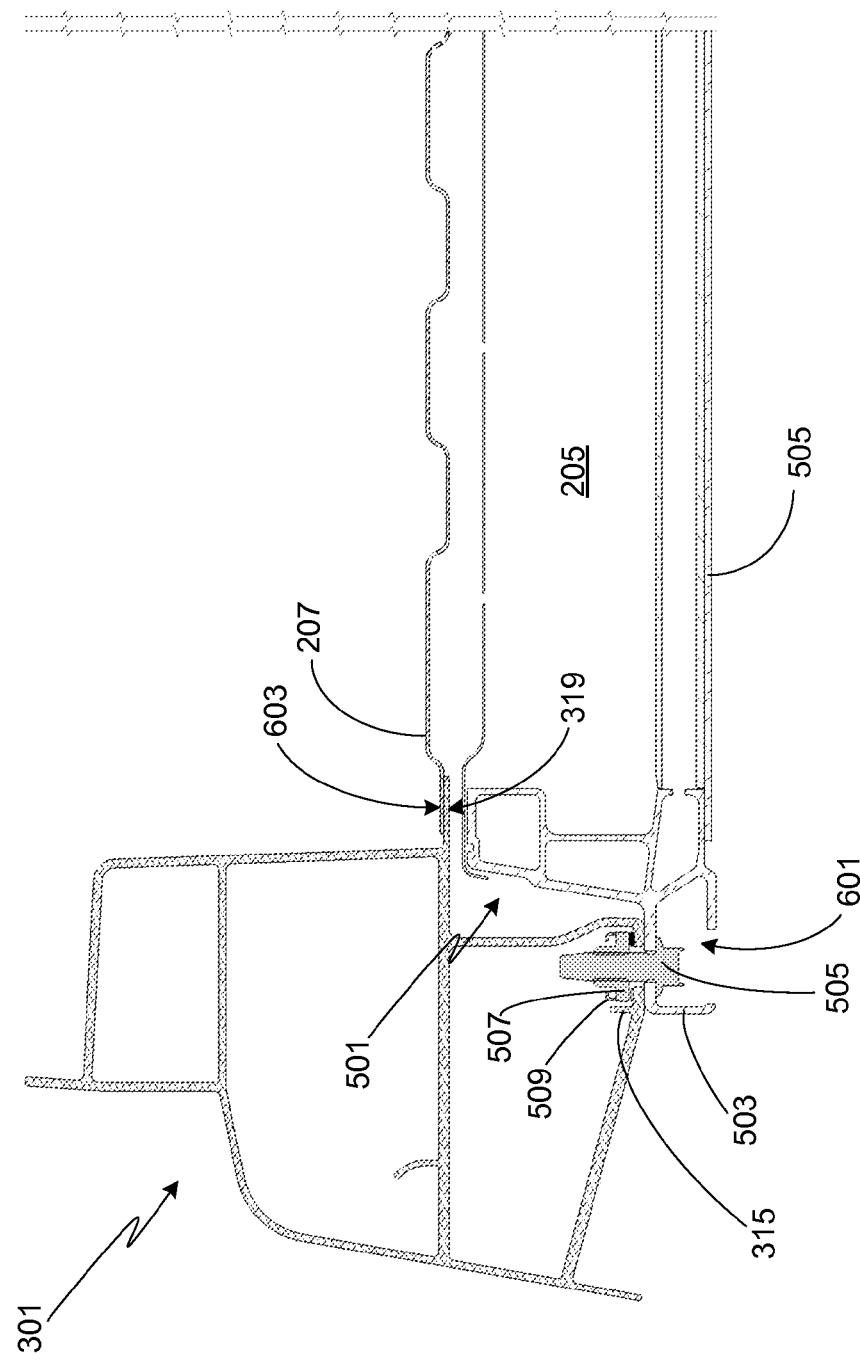
FIG. 6 provides a cross-sectional view of the assembly shown in FIG. 5.

FIGS. 5 and 6 provide perspective and cross-sectional views, respectively, of the attachment of battery pack 205 to extruded rocker 301, these figures illustrating some of the benefits of the extruded rocker of the invention. In the illustrated embodiment, battery pack enclosure 205 includes side members 501. Side members 501 include an extended mounting flange, or region, 503 that is positioned under rocker 301. Region 503 includes a cavity 601 and perforations on the upper and lower surfaces that allow passage of a plurality of mounting bolts 505. Mounting bolts 505, in combination with nuts 507, mechanically couple extended region 503 of member 501 to rocker 301. To simplify assembly, channel nuts 507 are held in place during vehicle assembly using a channel nut retainer 509. Retainer 509 is positioned within rocker 301 using internal feature 315, thereby simplifying vehicle assembly and reducing manufacturing costs. Prior art rocker panels do not provide a means of easily and accurately locating such features within the interior of the rocker panel.

As previously noted, the present invention may be used to accurately position and integrate various features on both the internal and external surfaces of a rocker panel. FIG. 3 illustrates an exemplary exterior feature 319. Feature 319 is a mounting flange, or lip, that extends inwardly from surface 303 of rocker 301 towards the vehicle centerline, feature 319 providing a mounting surface for vehicle floor panel 207. As shown in FIG. 6, a portion 603 of the perimeter of floor panel 207 rests on top of, and is preferably mechanically coupled to, feature 319. In at least one embodiment, portion 603 of floor panel 207 is welded to rocker panel feature 319. Alternately, floor panel 207 may be bolted to feature 319.

While the extruded rocker panel of the present invention is shown integrated into an electric vehicle, it should be understood that the present invention is equally applicable to non-electric vehicles.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

The invention claimed is:

1. A single piece, extruded, vehicle rocker panel, said vehicle rocker panel extruded as a single piece, said vehicle rocker panel comprised of at least an exterior wall, an interior wall and at least one enclosed cavity running longitudinally throughout the vehicle rocker panel, wherein said vehicle rocker panel is configured to provide a mounting surface for a battery pack enclosure, and wherein said mounting surface of said vehicle rocker panel is configured to allow said battery pack enclosure to be bolted to said vehicle rocker panel.

2. The single piece, extruded, vehicle rocker panel of claim 1, further comprising an upper wall and a lower wall.

3. The single piece, extruded, vehicle rocker panel of claim 2, further comprising a reinforcing wall, wherein said reinforcing wall couples an inner surface of said upper wall to an inner surface of said lower wall, and wherein said reinforcing wall divides said at least one enclosed cavity into at least two side-by-side cavities.

4. The single piece, extruded, vehicle rocker panel of claim 1, further comprising a reinforcing wall, said reinforcing wall dividing said at least one enclosed cavity into a first cavity and a second cavity.

5. The single piece, extruded, vehicle rocker panel of claim 4, wherein said reinforcing wall couples an inner surface of said exterior wall to an inner surface of said interior wall, and wherein said first cavity is located within an upper portion of said vehicle rocker panel and said second cavity is located within a lower portion of said vehicle rocker panel.

6. The single piece, extruded, vehicle rocker panel of claim 1, wherein said at least one enclosed cavity is divided into multiple cavities by at least one horizontal reinforcing wall and at least one vertical reinforcing wall.

7. The single piece, extruded, vehicle rocker panel of claim 6, wherein said at least one horizontal reinforcing wall couples an inner surface of said exterior wall to an inner surface of said interior wall, and wherein said at least one vertical reinforcing wall couples an inner surface of an upper wall to an inner surface of a lower wall.

8. The single piece, extruded, vehicle rocker panel of claim 1, wherein said vehicle rocker panel is fabricated from a material selected from the group of materials consisting of aluminum, aluminum alloys, and steel.

9. The single piece, extruded, vehicle rocker panel of claim 1, further comprising a mounting flange extending inwardly from said interior wall towards a vehicle centerline.

10. The single piece, extruded, vehicle rocker panel of claim 9, wherein said mounting flange is configured to provide a mounting surface for a vehicle floor panel.

11. The single piece, extruded, vehicle rocker panel of claim 10, wherein said vehicle floor panel is welded to said mounting flange.

12. The single piece, extruded, vehicle rocker panel of claim 10, wherein said vehicle floor panel is bolted to said mounting flange.

13. The single piece, extruded, vehicle rocker panel of claim 1, further comprising an interior, non-reinforcing wall that extends from an inner surface of at least one wall of said vehicle rocker panel into said at least one enclosed cavity.

14. The single piece, extruded, vehicle rocker panel of claim 13, wherein said interior, non-reinforcing wall is configured to locate and position a channel nut retainer within said at least one enclosed cavity.

15. The single piece, extruded, vehicle rocker panel of claim 13, wherein said interior, non-reinforcing wall extends from a single inner surface of said vehicle rocker panel.

16. The single piece, extruded, vehicle rocker panel of claim 1, wherein said vehicle rocker panel is comprised of an upper rocker section and a lower rocker section, wherein said upper and lower rocker sections are staggered.

17. The single piece, extruded, vehicle rocker panel of claim 16, wherein said interior wall is comprised of a first interior wall portion corresponding to said upper rocker section and a second interior wall portion corresponding to said lower rocker section, and wherein said first interior wall portion is offset from said second interior wall portion.

* * * * *